(No Model.)
L. M. HALSEY.
DENTAL RUBBER DAM.
No. 300,600. Patented June 17, 1884.
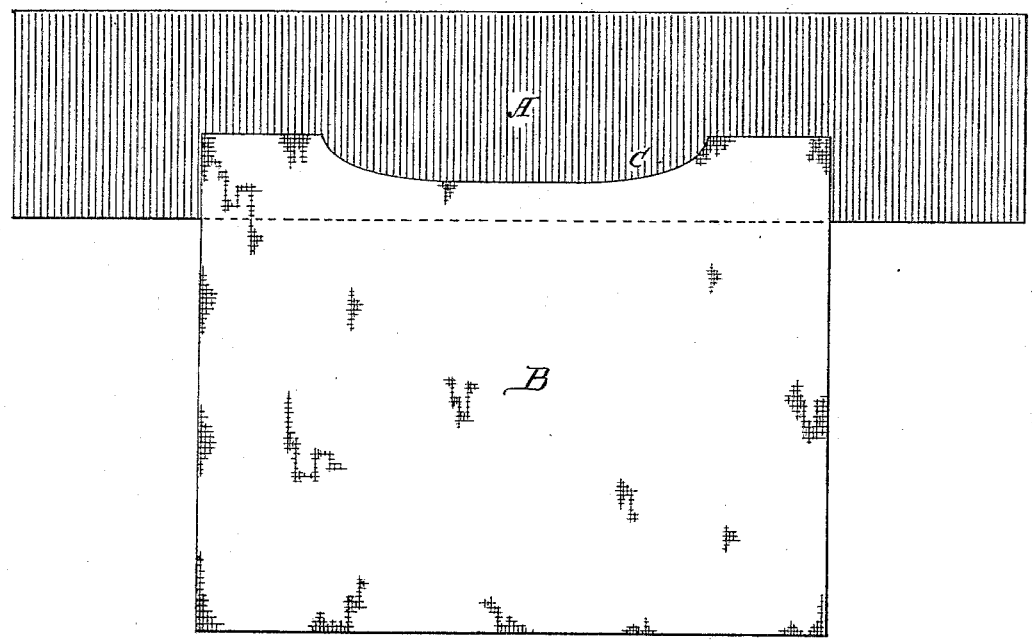
Witnesses.
Inventor.

UNITED STATES PATENT OFFICE.

LOUIS M. HALSEY, OF BROOKLYN, NEW YORK.

DENTAL RUBBER DAM.

SPECIFICATION forming part of Letters Patent No. 300,600, dated June 17, 1884.

Application filed February 21, 1884. (No model.)

*To all whom it may concern:*

Be it known that I, LOUIS M. HALSEY, of the city of Brooklyn, county of Kings, and State of New York, have invented a new and useful Improvement in Rubber Dams for Dental and other Purposes, of which the following is a specification, reference being had to the accompanying drawing, wherein the figure shows the simplest form of its application.

The object of my invention is to avail myself of all the advantages of the rubber dam in dentistry or surgery, where the object sought is to prevent the presence or accretion of moisture which might interfere with the operation attempted, and at the same time to avoid the difficulty in respiration due to the presence of the dam, and to avoid the inconvenience due to the flow of fluids, particularly in dentistry, due to salivary action.

The nature of my invention consists in reducing the rubber dam to dimensions which are only sufficient for the purpose necessary, and to attach to it in a proper and convenient manner an apron of such an absorbent character as will permit of fairly unimpeded respiration and with a capacity of absorption sufficient for the immediate purpose for which it may be applied.

In the drawing, A is a sheet of flat rubber, thin, and such as is ordinarily used for damming purposes. On the back side of this sheet and on one edge thereof, at c, is pasted, preferably with an insoluble cement, an apron, B, of any desired dimensions, of some material having absorbent qualities, such as cotton or linen cloth. The absorbent capacity of such apron could be increased by additional thicknesses of material, or by adding in any shape absorbent material.

In operation, when the dam is applied by making perforations therein to admit of the passage of the parts to be treated, the absorbent apron will so depend as to receive any fluids, salivary or otherwise, that may flow from parts in or about said parts so treated, and so prevent the absorption of said fluids by the garments or other absorbent articles within reach of their flow.

Thus having described my invention, what I claim as new is—

A rubber dam consisting of a sheet of rubber with an apron attached thereto and depending therefrom, of an absorbent character to take up and absorb the fluids which may flow from parts in or about the parts being treated, all as and for the purposes set forth.

LOUIS M. HALSEY.

Witnesses:
E. B. BARNUM,
J. W. SANDERSON.